(12) United States Patent
Hattori et al.

(10) Patent No.: US 7,116,966 B2
(45) Date of Patent: Oct. 3, 2006

(54) TRANSMITTING/RECEIVING FILTER DEVICE AND COMMUNICATION DEVICE

(75) Inventors: Jun Hattori, Takatsuki (JP); Hiroyuki Kubo, Kusatsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 374 days.

(21) Appl. No.: 10/487,880

(22) PCT Filed: Aug. 13, 2003

(86) PCT No.: PCT/JP03/10283

§ 371 (c)(1),
(2), (4) Date: Feb. 26, 2004

(87) PCT Pub. No.: WO2004/025850

PCT Pub. Date: Mar. 25, 2004

(65) Prior Publication Data

US 2004/0242164 A1    Dec. 2, 2004

(30) Foreign Application Priority Data

Sep. 13, 2002   (JP) .............................. 2002-269121

(51) Int. Cl.
*H04B 1/16* (2006.01)
(52) U.S. Cl. .................. 455/334; 455/73; 455/78; 455/306; 455/307; 455/339; 333/101; 333/109; 333/136
(58) Field of Classification Search ................ 455/73, 455/303–308; 333/101, 104, 109, 117, 136
See application file for complete search history.

(56) References Cited

U.S. PATENT DOCUMENTS 6,756,859 B1*   6/2004   Kodim ...................... 333/101
2002/0086650 A1*   7/2002   Haapoja ..................... 455/120

FOREIGN PATENT DOCUMENTS

| JP | 06-216803 | 8/1994 |
| JP | 06-237229 | 8/1994 |
| JP | 10-313265 | 11/1998 |
| JP | 2001-358605 | 12/2001 |
| JP | 2002-124901 | 4/2002 |
| WO | WO 02/31997 A2 | 4/2002 |

* cited by examiner

*Primary Examiner*—Quochien B. Vuong
*Assistant Examiner*—Zhiyu Lu
(74) *Attorney, Agent, or Firm*—Dickstein, Shapiro, LLP.

(57) ABSTRACT

First and second transmission paths P1 and P2 are disposed between a first port #1 connected to an antenna ANT and a second port #2 connected to a transceiving circuit 10. The first transmission path P1 includes receiving filters Rx1, Rx2, and Rx2', an amplification circuit LNA, and 90° hybrid circuits 12 and 14. The second transmission path P2 includes a transmitting filter Tx1. A received signal amplified by the amplification circuit LNA is transmitted to the port #2 via the 90° hybrid circuits 12 and 14, but is not transmitted to the second transmission path P2. A transmission signal is transmitted from the port #2 to the second transmission path P2. This prevents oscillation of the received signal due to positive feedback. A transceiving filter device that prevents degradation in the insertion loss, noise figure, and group delay characteristics in the transmission frequency band or the receiving frequency band and that prevents oscillation, and a communication apparatus using the transceiving filter device are provided.

4 Claims, 8 Drawing Sheets

TRANSMITTING/RECEIVING FILTER DEVICE AND COMMUNICATION DEVICE

TECHNICAL FIELD

The present invention relates to a transceiving filter device that selectively passes a transmission signal and a received signal, and to a communication apparatus including the transceiving filter device.

BACKGROUND ART

In the related art, a base station in a mobile communication system includes a transceiving filter device having an amplification circuit between a tower antenna and a transceiving circuit for amplifying a received signal.

For example, Patent Document 1 (International Publication No. 02/31997 pamphlet) shows a transceiving filter device having first and second transmission paths between a first port connected to an antenna and a second port connected to a transceiving circuit.

Figure 8:
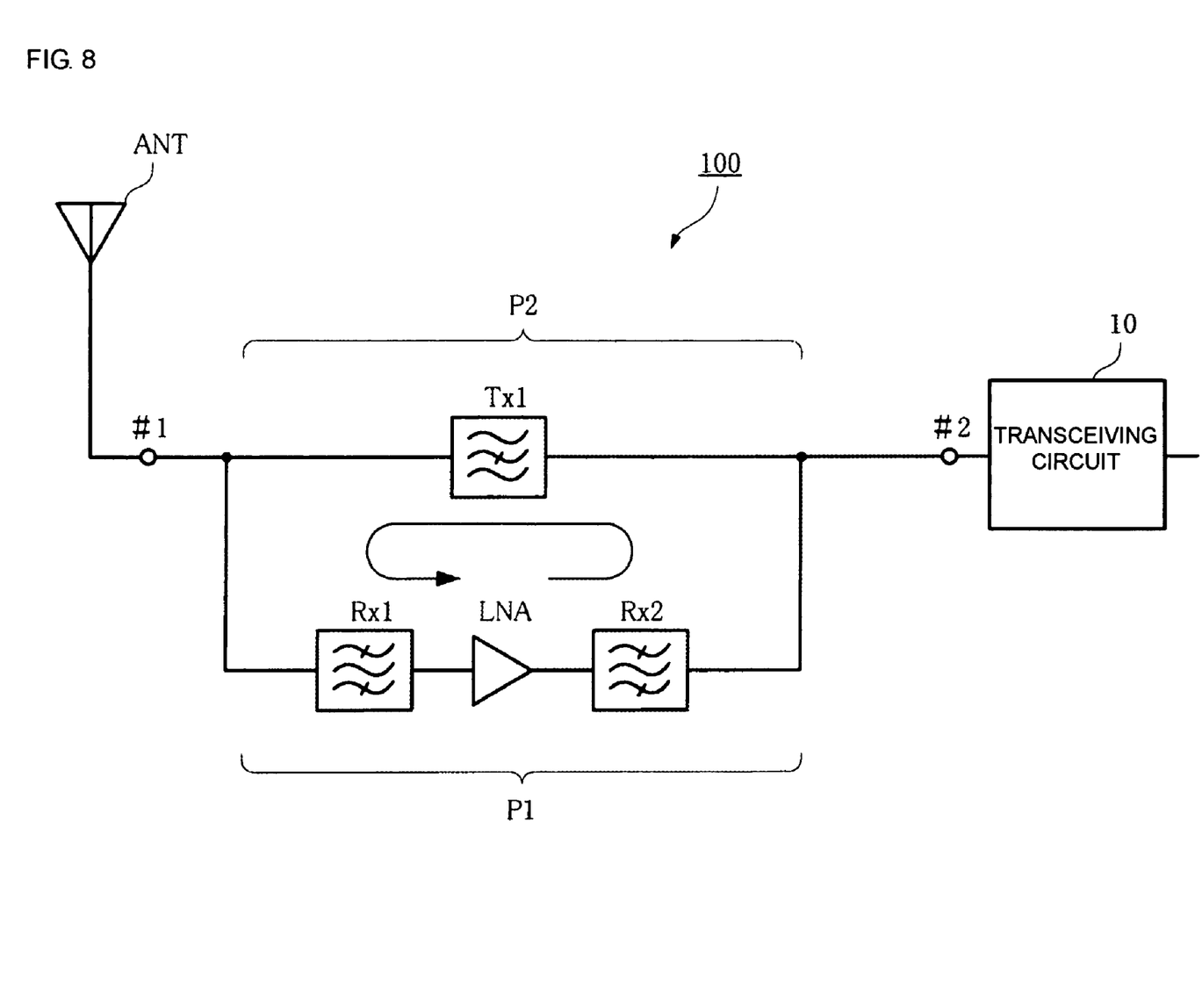
FIG. 8 is a block diagram showing the structure of a communication apparatus having a transceiving filter device of the related art.

This structure is shown in FIG. 8. In FIG. 8, reference symbol ANT denotes an antenna, reference numeral 10 denotes a transceiving circuit, reference numeral P1 denotes a first transmission path that allows a received signal to pass, and reference numeral P2 denotes a second transmission path that allows a transmission signal to pass. The first transmission path P1 includes receiving filters Rx1 and Rx2 having a bandpass characteristic that allows a received signal to pass, and an amplification circuit LNA. The second transmission path P2 includes a transmitting filter Tx1 having a bandstop characteristic that stops only a received signal.

With this structure, a received signal input from the antenna ANT is amplified in the first transmission path P1, and is then sent to the transceiving circuit 10, and a transmission signal from the transceiving circuit 10 is sent to the antenna ANT via the second transmission path P2.

However, as shown in FIG. 8, when the first and second transmission paths P1 and P2 are provided and either path includes an amplification circuit, the two transmission paths may form a feedback loop. The transmitting filter Tx1 passes the transmission frequency band and stops the receiving frequency band. However, if the amount of attenuation in the vicinity of the receiving frequency band of the transmission filter is not satisfactory, the output signal of the amplification circuit LNA is oscillated because of positive feedback in the path of Rx2→Tx1→Rx1→LNA. In order to suppress occurrence of such oscillation, a large amount of attenuation in the receiving frequency band of the transmitting filter Tx1 must be maintained so that the loop gain is equal to or less than 1. Therefore, it is necessary to increase the stop bandwidth of the receiving frequency band of the transmitting filter Tx1 or to reduce the pass bandwidths of the receiving filters Rx1 and Rx2. As a result, there arises a problem in that insertion loss (IL), nose figure (NF), and group delay (GD) characteristics in the transmission frequency band or the receiving frequency band are degraded.

Accordingly, it is an object of the present invention to provide a transceiving filter device that suppresses degradation in the insertion loss, noise figure, and group delay characteristics in the transmission frequency band or the receiving frequency band and that prevents oscillation, and to provide a communication apparatus using the transceiving filter device.

DISCLOSURE OF INVENTION

In order to achieve the above-described object, the present invention provides a transceiving filter device including a first transmission path and a second transmission path between a first port connected to an antenna and a second port connected to a transceiving circuit, the first transmission path including an amplification circuit that amplifies a received signal and a receiving filter that allows a receiving-frequency-band signal to pass, the second transmission path allowing a transmission signal to pass, wherein an element that prevents positive feedback of the received signal in a loop formed of the first transmission path and the second transmission path is disposed in the loop.

With the element that prevents positive feedback of the received signal, positive feedback in which the received signal returns to the input side of the first transmission path via the second transmission path does not occur, thus preventing oscillation.

In the present invention, furthermore, the second transmission path includes a transmitting filter that passes the transmission signal and that stops a receiving-frequency-band signal, and a circuit having directivity in which the received signal amplified by the amplification circuit is transmitted to the second port and the transmission signal input from the second port is transmitted to the second transmission path is disposed at the output side of the amplification circuit of the first transmission path and at a connection between the first transmission path and the second transmission path, wherein this circuit serves as the element that prevents positive feedback.

With this structure, the received signal passing through the first transmission path is transmitted to the second port, and is not transmitted to the second transmission path. Positive feedback of the received signal does not occur, thus preventing oscillation.

In the present invention, furthermore, the circuit having directivity is formed of a coupled-line directional coupler that transmits the received signal amplified by the amplification circuit to the second port and that transmits the transmission signal input from the second port to the second transmission path, and a termination resistor that terminates a portion of the amplified received signal.

In the present invention, furthermore, the circuit having directivity is formed of a 90° hybrid circuit that transmits the received signal amplified by the amplification circuit to the second port and that transmits the transmission signal input from the second port to the second transmission path, and a termination resistor that terminates a portion of the amplified received signal.

In the present invention, furthermore, the 90° hybrid circuit has a plurality of stages.

In the present invention, furthermore, the circuit having directivity is formed of a circulator that transmits the received signal amplified by the amplification circuit to the second port and that transmits the transmission signal input from the second port to the second transmission path.

The present invention further provides a communication apparatus including a duplexer antenna and a transceiving circuit, wherein the transceiving filter device is disposed between the antenna and the transceiving circuit.

BEST MODE FOR CARRYING OUT THE INVENTION

Figure 1:
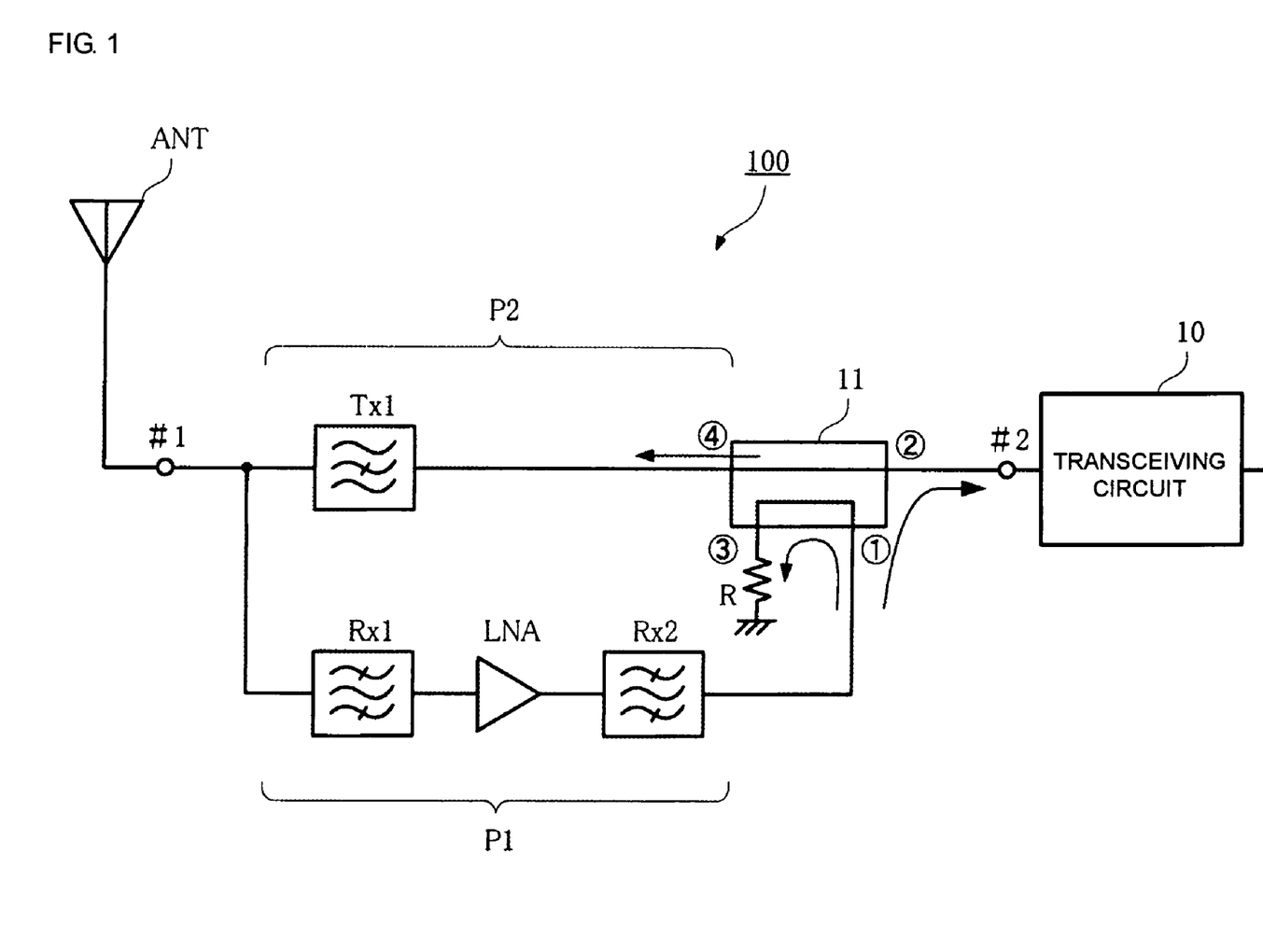
FIG. 1 is a block diagram showing the structure of a communication apparatus having a transceiving filter device according to a first embodiment.

FIG. 1 shows the structure of a communication apparatus having a transceiving filter device according to a first embodiment. In FIG. 1, reference symbol ANT denotes an antenna of a base station, and a transceiving circuit 10 is a circuit that transmits and receives a communication signal in the base station. In FIG. 1, the components other than the antenna ANT and the transceiving circuit 10 form a transceiving filter device 100.

The antenna ANT is connected to a first port #1 of the transceiving filter device 100, and the transceiving circuit 10 is connected to a second port #2 of the transceiving filter device 100. The transceiving filter device 100 and the antenna ANT are disposed on the tower top portion of the base station. Reference numerals Rx1 and Rx2 denote receiving filters having a bandpass characteristic that allows a receiving-frequency-band signal to pass and that stops a transmission-frequency-band signal. Reference symbol LNA denotes a low-noise amplification circuit. The two receiving filters Rx1 and Rx2 are disposed on the input and output sides of the amplification circuit LNA, respectively, and these components are placed in a first transmission path P1.

Reference numeral Tx1 denotes a transmitting filter having a bandstop filter characteristic that allows a transmission-frequency-band signal to pass and that stops a receiving-frequency-band signal. The transmitting filter Tx1 is placed in a second transmission path P2.

Reference numeral 11 denotes a coupled-line directional coupler. The directional coupler 11 couples a line between ports (1) and (3) thereof and a line between ports (2) and (4) thereof, and separates the ports (1) and (4) and the ports (3) and (2). The ports (2) and (4) of the directional coupler 11 are connected to the second port #2 and the transmitting filter Tx1, respectively. The port (1) is connected to the receiving filter Rx2. The port (3) terminates with a resistor R.

Thus, an input signal from the port (1) of the directional coupler 11 is output to the ports (2) and (3). An input signal from the port (2) is output to the port (4). Therefore, a received signal from the antenna ANT passes through the receiving filter Rx1, and is then amplified by the amplification circuit LNA. The amplified signal passes through the receiving filter Rx2, and is then output to the second port #2 via the directional coupler 11. A transmission signal from the transceiving circuit 10 is input from the second port #2, passing through the transmitting filter Tx1 via the directional coupler 11, and is then output to the antenna ANT from the first port #1. The received signal output from the receiving filter Rx2 does not return to the second transmission path P2, and is not oscillated since positive feedback does not occur. Therefore, it is not necessary to forcedly increase the stop bandwidth of the receiving frequency band of the transmitting filter Tx1 or to reduce the pass bandwidths of the receiving filters Rx1 and Rx2 more than necessary. Moreover, the insertion loss, noise figure, and group delay characteristics of the transmission signal or received signal are not degraded.

Figure 2:
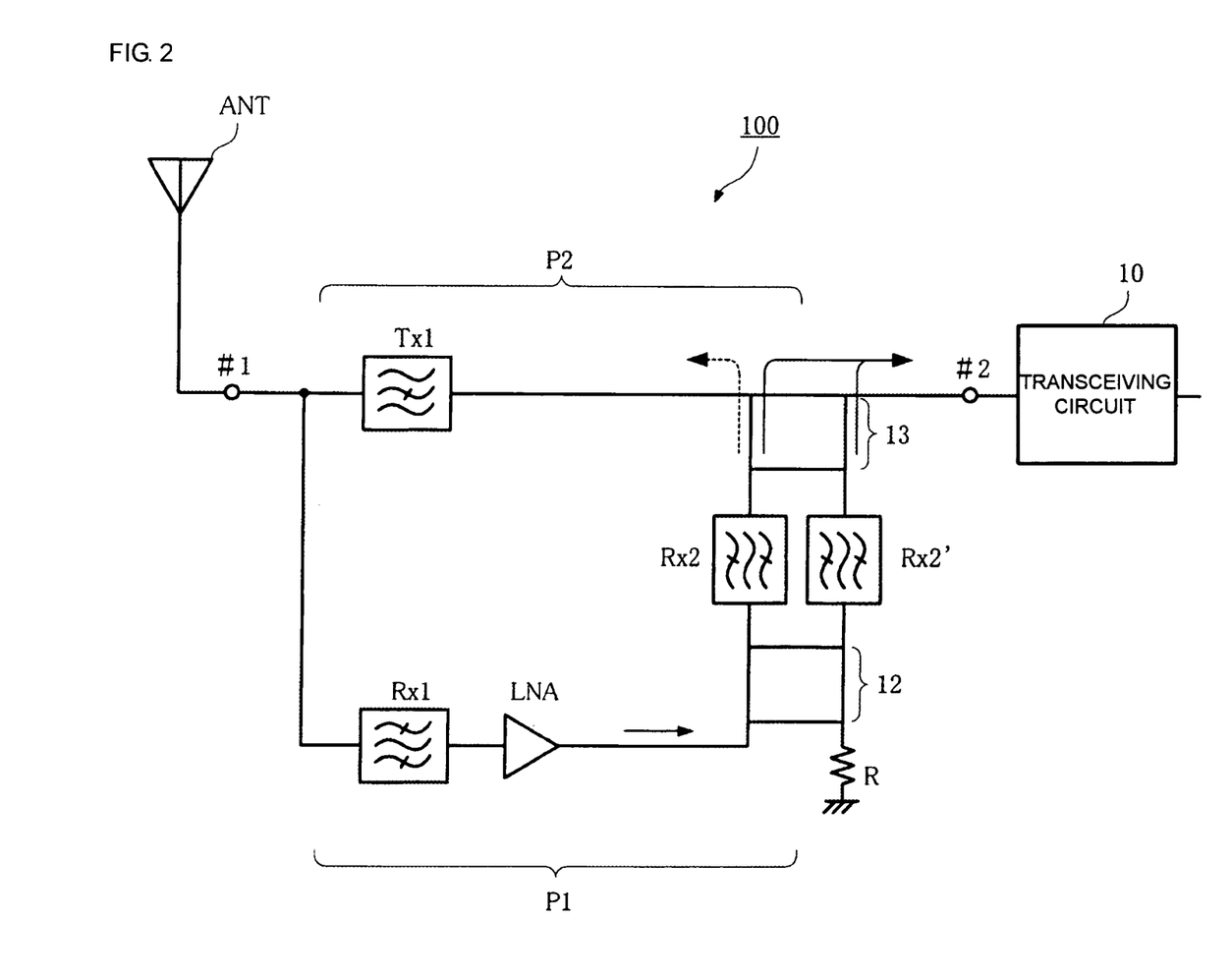
FIG. 2 is a block diagram showing the structure of a communication apparatus having a transceiving filter device according to a second embodiment.

FIG. 2 shows the structure of a communication apparatus having a transceiving filter device according to a second embodiment. In this example, 90° hybrid circuits 12 and 13 and receiving filters Rx2 and Rx2' are disposed at the connection between the first transmission path P1 and the second transmission path P2.

The 90° hybrid circuits (hereinafter referred to simply as "hybrid circuits") 12 and 13 are power-halving circuits having directivity in the signal transmission direction. The hybrid circuit 12 power-halves the received signal amplified by the amplification circuit LNA, and the hybrid circuit 13 outputs the received signal which has passed through the receiving filters Rx2 and Rx2' to the port #2. As described below, the received signal which has passed through the receiving filters Rx2 and Rx2' is not transmitted to the second transmission path P2.

The receiving filters Rx2 and Rx2' disposed between the two 90° hybrid circuits 12 and 13 pass the receiving frequency band and stop the transmission frequency band. This prevents a transmission signal from entering the first transmission path P1 from the port #2. The structure of the other components is similar to that of the first embodiment.

Figure 3:
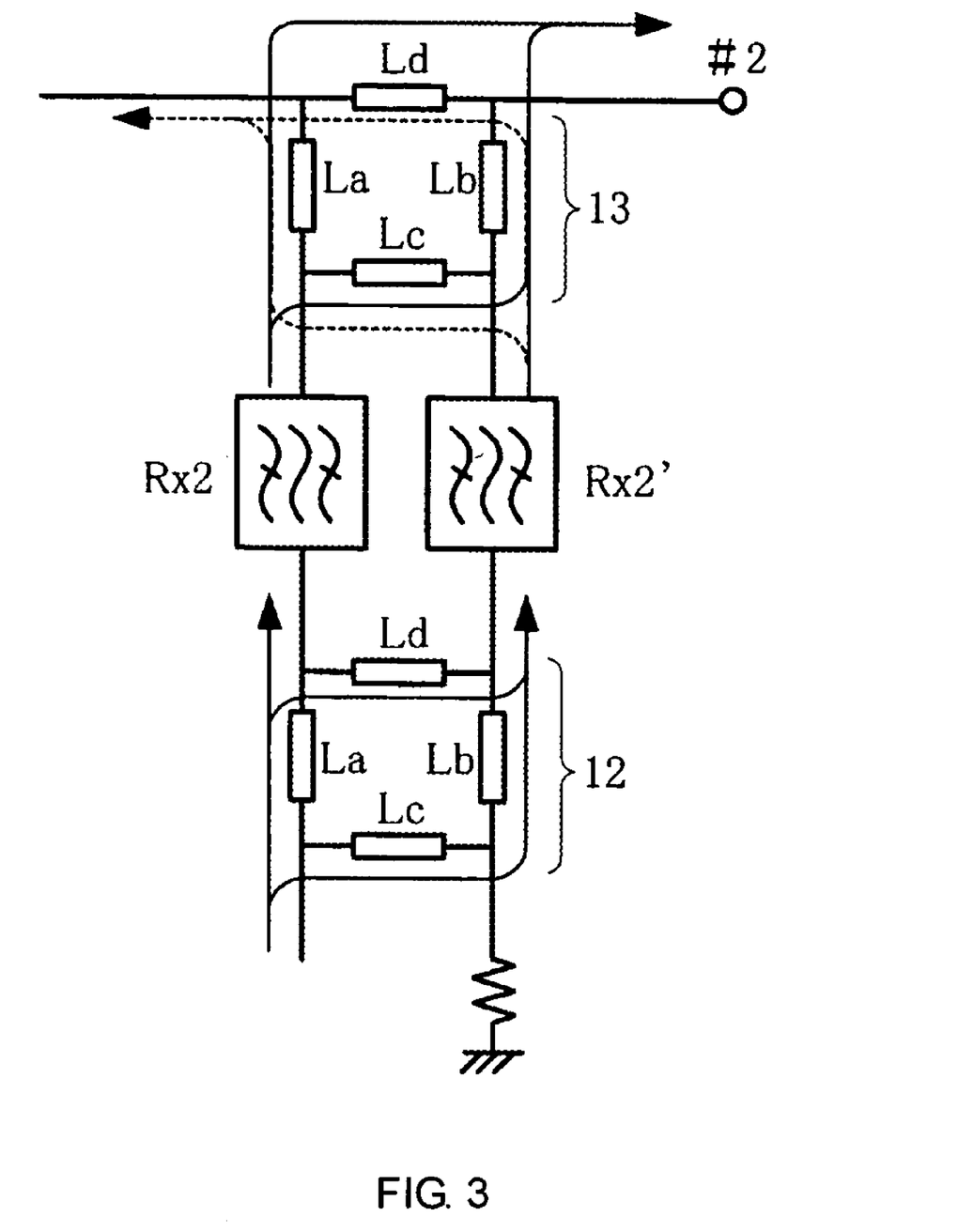
FIG. 3 is a diagram showing the structure of hybrid circuits included in the transceiving filter device.

FIG. 3 shows the operation of the hybrid circuits 12 and 13. The lines at the four sides of each of the hybrid circuits 12 and 13 are represented by La, Lb, Lc, and Ld. Where the impedance of the lines Lc and Ld is Zo, the impedance of the lines La and Lb is given by $Zo/\sqrt{2}$. Each line has an electrical length of one-quarter the wavelength of the transmission frequency. Therefore, the received signal input to the hybrid circuit 12 is power-halved into two opposite-phase signals, which are then input to the receiving filters Rx2 and Rx2', respectively. The two receiving filters Rx2 and Rx2' have substantially the same filter characteristic. The signals which have passed through the receiving filters Rx2 and Rx2' are phase-combined again by the hybrid circuit 13, and the result is transmitted to the port #2. The signals which are to be transmitted in the direction indicated by a broken line shown in FIG. 3 are combined in opposite phase, and are cancelled, so as not to be transmitted. The receiving filters Rx2 and Rx2' inserted between the two hybrid circuits 12 and 13 allow received signals, once branched, to be superposed in phase in the direction of the port #2 and to be superposed in opposite phase in the direction of the port #1 when they are combined again.

The transmission signal input from the port #2 is input to the receiving filters Rx2 and Rx2' via the hybrid circuit 13, but this signal is stopped by the receiving filters Rx2 and Rx2' and is not input to the output side of the amplification circuit LNA shown in FIG. 2. Therefore, the amplification circuit LNA is not damaged and does not suffer from distortion such as intermodulation distortion.

In this way, the received signal is transmitted with directivity to the port #2, resulting in no positive feedback of the received signal by the loop of the two transmission paths P1 and P2 shown in FIG. 2.

The structure of a communication apparatus having a transceiving filter device according to a third embodiment will now be described with reference to FIGS. 4 through 6.

Figure 4:
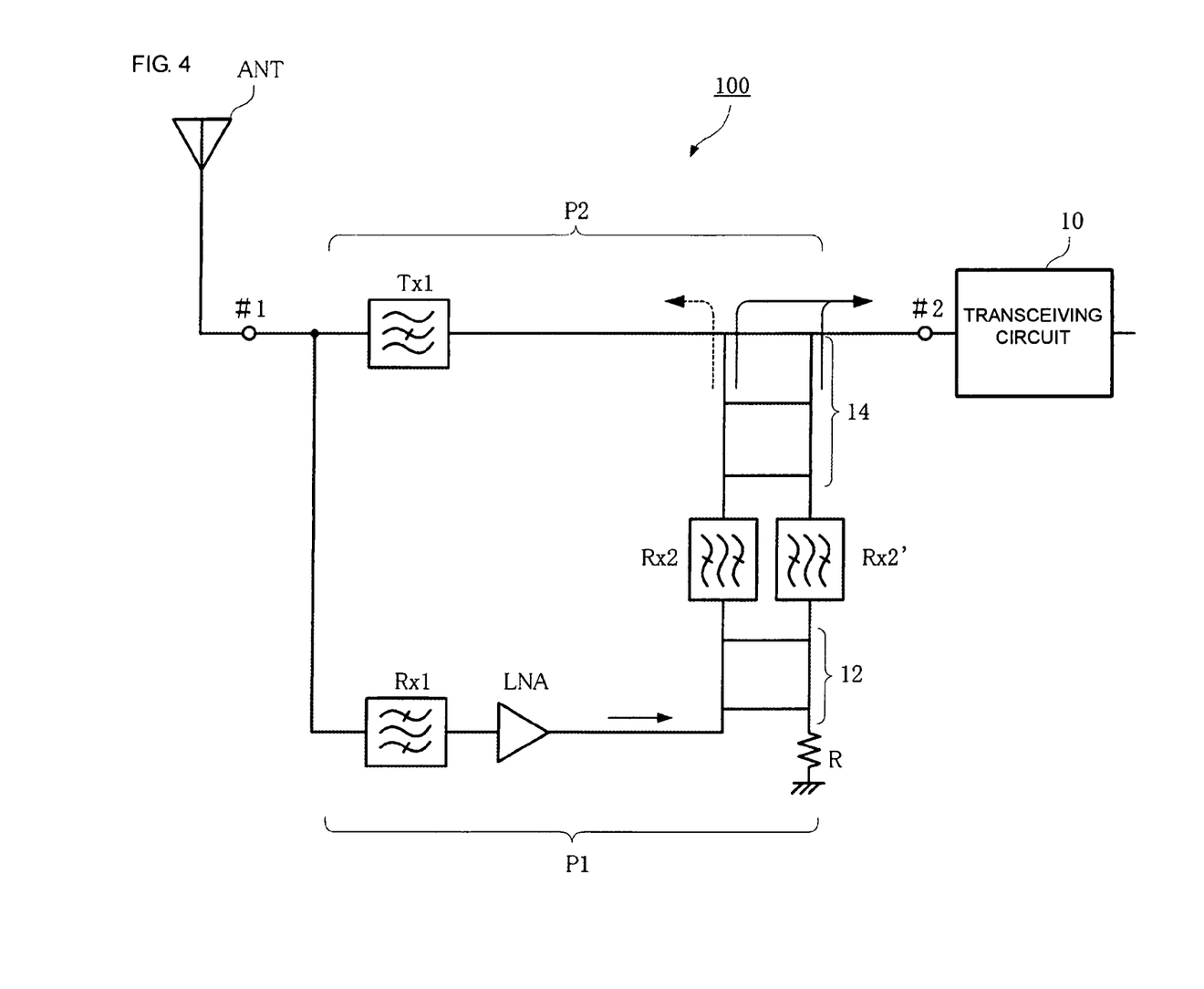
FIG. 4 is a block diagram showing the structure of a communication apparatus having a transceiving filter device according to a third embodiment.

FIG. 4 is a block diagram of the transceiving filter device. The basic structure of this transceiving filter device is the same as that of the transceiving filter device shown in FIG. 2. In this example, one of two 90° hybrid circuits, that is, a 90° hybrid circuit 14, has a two-stage structure. The structure of the remaining components is similar to that shown in FIG. 2.

Figure 5:
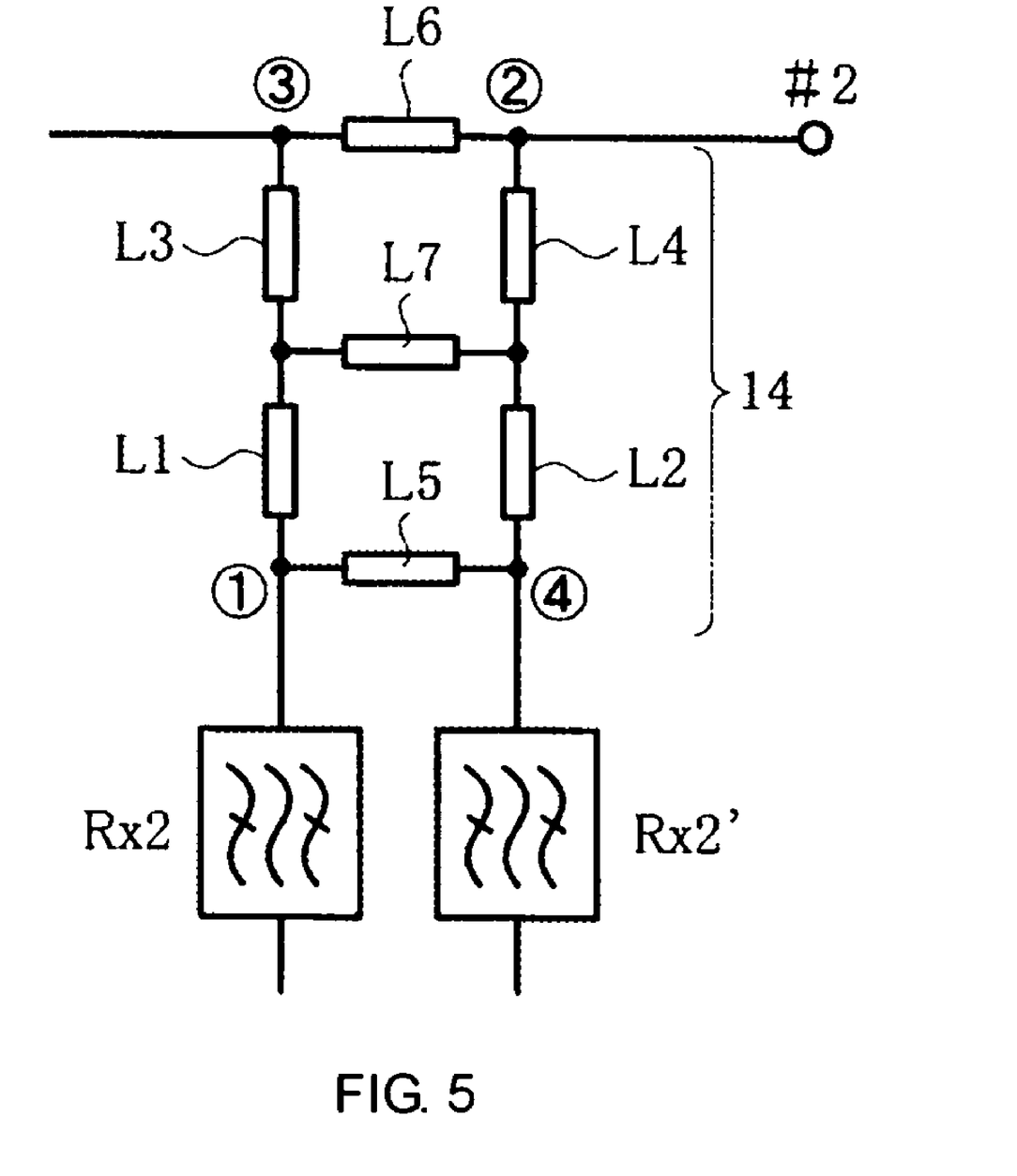
FIG. 5 is a diagram showing the structure of a hybrid circuit included in the transceiving filter device.

FIG. 5 shows the structure of the hybrid circuit 14 portion. Each of lines L1 through L7 has an electrical length of one-quarter the wavelength of the transmission frequency. The impedances of these lines are as follows:

L1 through L4: 35.95 Ω
L5 and L6: 105.23 Ω
L7: 47.26 Ω

Figure 6:
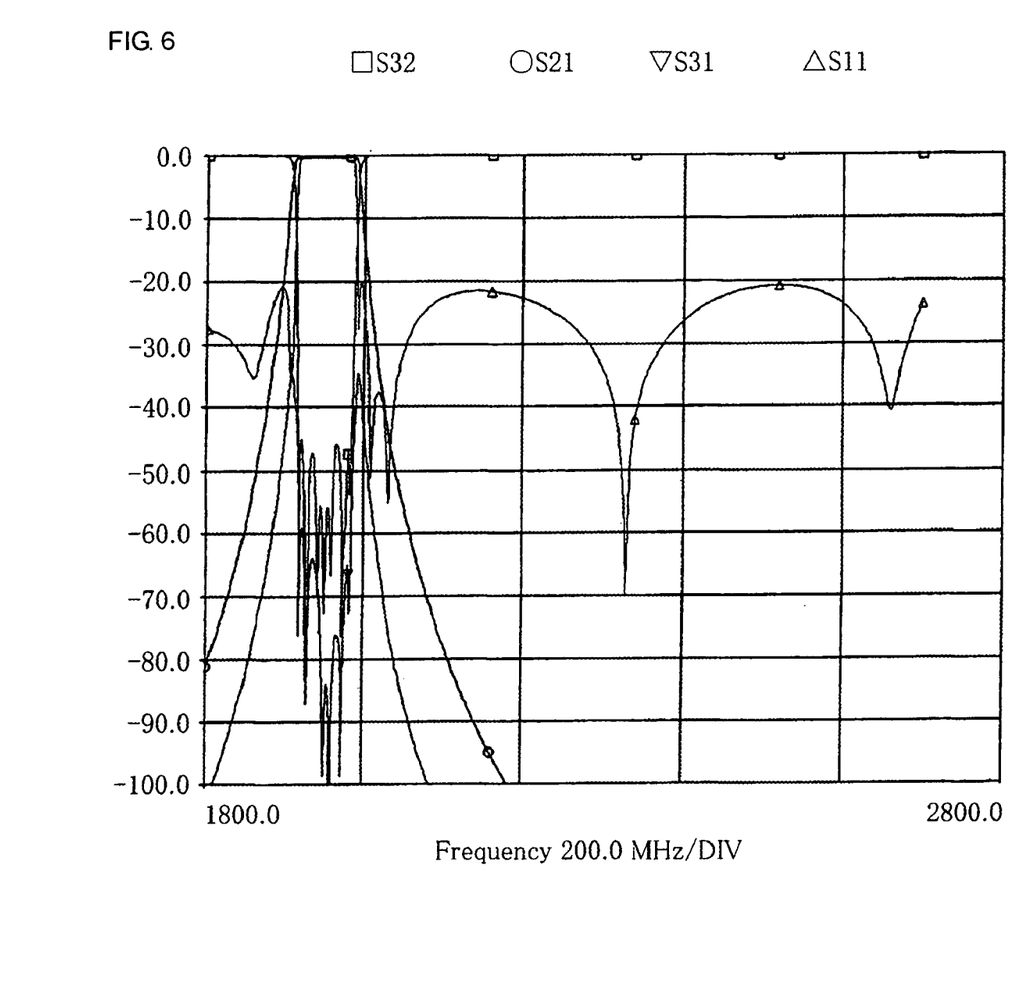
FIG. 6 is a characteristic chart of the hybrid circuit.

FIG. 6 shows characteristics of the two-stage hybrid circuit, in which the y-axis designates the transmission loss or the reflection loss, expressed in dB. The center frequency of the receiving frequency band is 1950 MHz, and the transmission frequency band is outside the range of 1920 MHz to 1980 MHz. In FIG. 6, the curve indicated by circles represents the transmission characteristic (S21 characteristic) in the direction of ports (1)→(2), the curve indicated by rectangles represents the transmission characteristic (S32 characteristic) in the direction of ports (2)→(3) of the hybrid circuit, the curve indicated by downward-pointing triangles represents the transmission characteristic (S31 characteristic) in the (1)→(3) direction, and the curve indicated by upward-pointing triangles represents the reflection characteristic (S11 characteristic) of the port (1).

With such a two-stage 90° hybrid circuit, the S32 characteristic maintains substantially 0 dB across a broad frequency band including the transmission frequency band, thus achieving a low insertion loss characteristic. Therefore, the transmission signal is transmitted from the port (2) to the port (3) with low losses. The S21 characteristic also exhibits substantially 0 dB in the receiving frequency band, thus achieving a low insertion loss characteristic. Therefore, the received signal is transmitted from the port (1) to the port (2) with low losses.

With the use of such a 90° hybrid circuit, therefore, the pass bandwidth of the transmission frequency band can increase. A 90° hybrid circuit with three or more stages may also be used.

Figure 7:
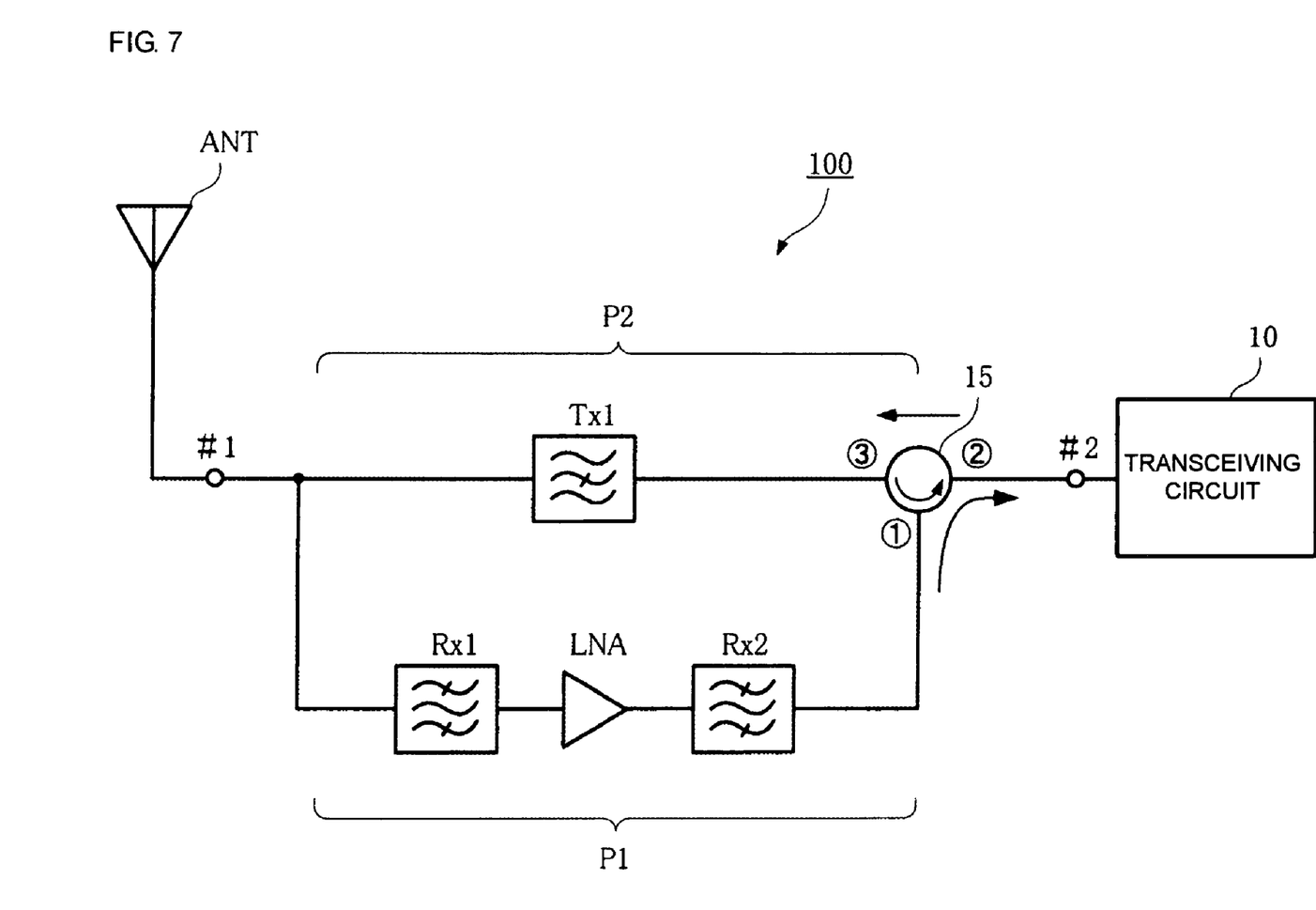
FIG. 7 is a block diagram showing the structure of a communication apparatus having a transceiving filter device according to a fourth embodiment.

FIG. 7 shows the structure of a communication apparatus having a transceiving filter device according to a fourth embodiment. In this example, a circulator 15 is disposed at the connection between the first transmission path P1 and the second transmission path P2. The circulator 15 is a circulator with a forward direction in the direction of ports (1)→(2) and (2)→(3). The received signal passing through the transmission path P1 is input to the port (1) of the circulator 15, and is transmitted to the port #2 from the port (2). The transmission signal input from the port #2 to the port (2) of the circulator 15 is output from the port (3), and is transmitted to the second transmission path P2.

Such a 2-GHz-band circulator can be manufactured at low cost, and the cost of the overall transceiving filter device can be reduced.

According to the present invention, in a transceiving filter device including a first transmission path and a second transmission path between a first port connected to an antenna and a second port connected to a transceiving circuit, the first transmission path including an amplification circuit that amplifies a received signal and a receiving filter that allows a receiving-frequency-band signal to pass, the second transmission path allowing a transmission signal to pass, positive feedback in which the received signal returns to the input side of the first transmission path via the second transmission path does not occur, thus preventing oscillation. Therefore, it is not necessary to increase the stop bandwidth (receiving frequency bandwidth) of the transmitting filter in the second transmission path or to reduce the pass bandwidth of the first transmission path for the received signal. As a result, the insertion loss, noise figure, and group delay characteristics of the transmission signal or the received signal can be improved.

According to the present invention, furthermore, a circuit having directivity in which the received signal amplified by the amplification circuit is transmitted to the second port and the transmission signal input from the second port is transmitted to the second transmission path is disposed at the output side of the amplification circuit of the first transmission path and at a connection between the first transmission path and the second transmission path. Therefore, the received signal passing through the first transmission path is transmitted to the second port, and is not transmitted to the second transmission path. Positive feedback of the received signal does not occur, thus ensuring that oscillation is prevented.

According to the present invention, furthermore, the circuit having directivity is formed of a coupled-line directional coupler and a termination resistor, thus preventing oscillation with the simple circuit structure.

According to the present invention, furthermore, the circuit having directivity is formed of a 90° hybrid circuit and a termination resistor, thus preventing oscillation with the simple circuit structure.

According to the present invention, furthermore, the 90° hybrid circuit has a plurality of stages, thus increasing the pass bandwidth for the transmission signal.

According to the present invention, furthermore, the circuit having directivity is formed of a circulator, thus reducing the cost.

According to the present invention, furthermore, the transceiving filter device is disposed between a duplexer antenna and a transceiving circuit, thus improving the insertion loss, noise figure, and group delay characteristics of the transmission signal or received signal. Therefore, a high-communication-performance communication apparatus capable of high-speed transmission with a low data error rate can be realized.

INDUSTRIAL APPLICABILITY

As described above, a transceiving filter device according to the present invention provides improvement in insertion loss, noise figure, and group delay characteristics of a transmission signal or received signal, and is suitable for a communication apparatus for use in, for example, microwave-band or millimeter-wave-band radio communication or electromagnetic wave transmission and reception.

The invention claimed is:

1. A transceiving filter device comprising:
a first transmission path and a second transmission path between a first port for connection to an antenna and a second port for connection to a transceiving circuit,
the first transmission path including:
an amplification circuit that amplifies a received signal;

a receiving filter disposed at an input side of the amplification circuit that allows a receiving-frequency-band signal to pass and stops a transmission signal; and a circuit having directivity disposed at an output side of the amplification circuit;

the second transmission path including a transmitting filter that allows the transmission signal to pass and that stops the receiving-frequency-band signal, and wherein the circuit having directivity transmits the received signal amplified by the amplification circuit to the second port and transmits the transmission signal input from the second port to the second transmission path, the circuit having directivity including:

at least two 90° hybrid circuits;

two band pass filters having similar characteristics to each other and that pass the receiving-frequency-band-signal and stop the transmission signal; and a termination resistor that terminates a portion of the received signal amplified by the amplification circuit, wherein output ports of the two band pass filters are connected in parallel to a first 90° hybrid circuit of the at least two 90° hybrid circuits, and input ports of the two band pass filters are connected in parallel to a second 90° hybrid circuit of the at least two 90° hybrid circuits.

2. The transceiving filter device according to claim 1, wherein the at least two 90° hybrid circuits have a plurality of stages.

3. A communication apparatus comprising an antenna connected to the first port of the transceiving filter device according to claim 1, and a transceiving circuit connected to the second port of the transceiving filter device.

4. A communication apparatus comprising an antenna connected to the first port of the transceiving filter device according to claims 2, and a transceiving circuit connected to the second port of the transceiving filter device.

* * * * *